A. R. PRIBIL.
METHOD OF MAKING CONNECTING RODS.
APPLICATION FILED DEC. 6, 1917.

1,350,177.

Patented Aug. 17, 1920.
2 SHEETS—SHEET 1.

Witness
Chas. W. Stauffer
Karl H. Butler

Inventor
Alexis R. Pribil,
By
Attorneys

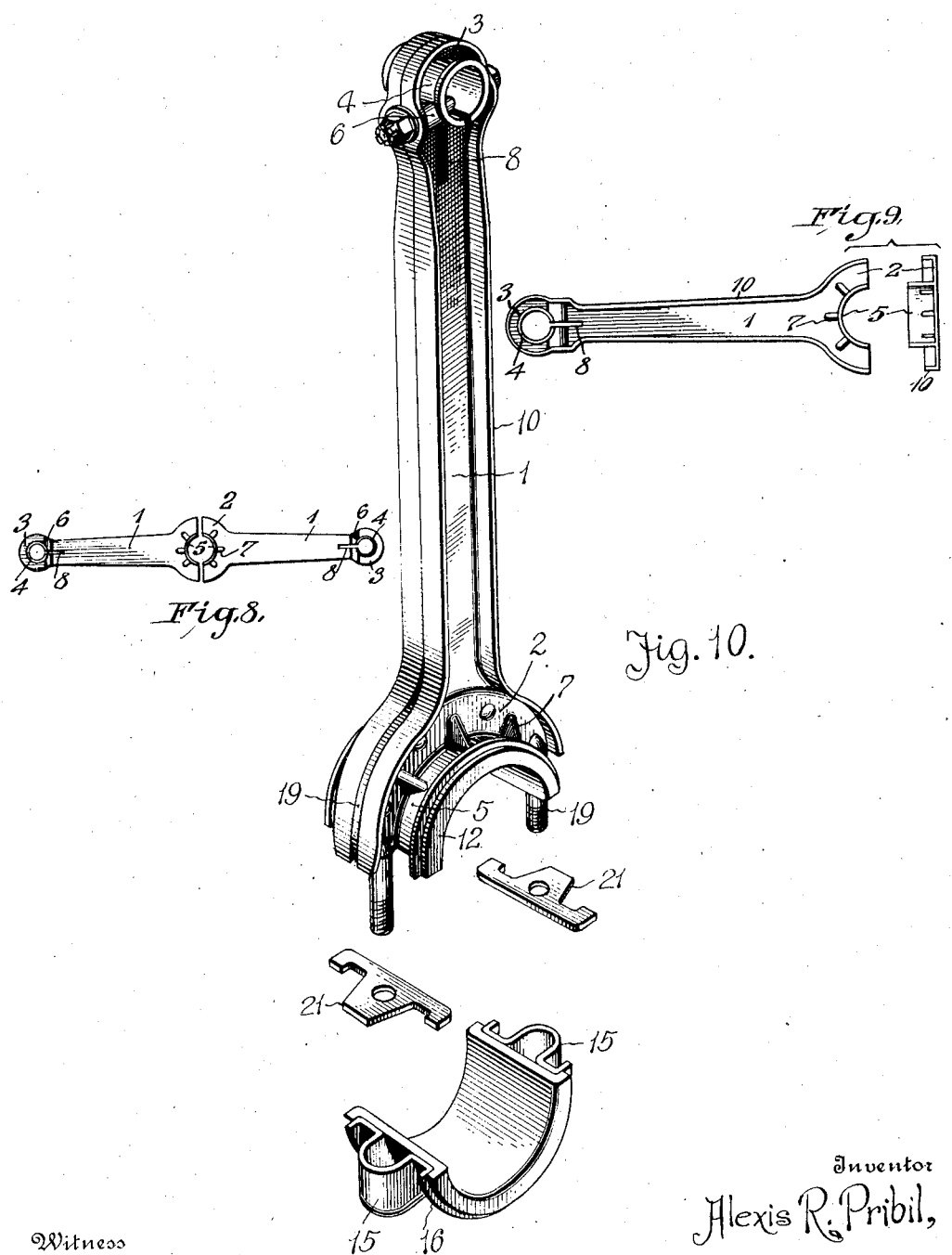

UNITED STATES PATENT OFFICE.

ALEXIS R. PRIBIL, OF CLEVELAND, OHIO.

METHOD OF MAKING CONNECTING-RODS.

1,350,177.  Specification of Letters Patent.  Patented Aug. 17, 1920.

Application filed December 6, 1917. Serial No. 205,765.

*To all whom it may concern:*

Be it known that I, ALEXIS R. PRIBIL, a citizen of the United States of America, residing at Cleveland, in the county of Cuyahoga and State of Ohio, have invented certain new and useful Improvements in Methods of Making Connecting-Rods, of which the following is a specification, reference being had therein to the accompanying drawings.

This invention relates to a method of making connecting rods, and has special reference to a method for expeditiously and economically producing what is commonly known as "pressed steel" connecting rods, and as instances of such rods there might be mentioned the subject-matter of my pending applications Serial No. 138,955, filed Dec. 26, 1916; Serial No. 180,053, filed July 12, 1917, and Serial No. 199,427, filed Oct. 31, 1917. These applications disclose connecting rods which are characterized by novel one-piece caps, reinforcing ribs or members that add strength and rigidity to the driven end of each rod, and novel means, including U bolts for connecting the caps to the driven ends of the connecting rods This particular application is directed to a method of manufacture which was evolved wholly or in part, during the production of the rods shown in my pending applications, and while some of the rods have been shown as having special fastening means for detachable caps, the present method of manufacture not only includes this special type of connecting rod, but is applicable to any rod made of pressed steel or a similar material.

This invention relates to a method of manufacture involving a plurality of operations or steps by which embryo formations of connecting rods may be practically completed. As with any pressed steel connecting rod, there is a shank, a drive end and a driven end, the latter being completed by a detachable cap. The shank, drive end and a portion of the driven end, are ordinarily made of two pieces of material properly stamped and formed, placed back to back and suitably connected. It has been the practice in the past to make one part of a single connecting rod at a time, and in some instances, parts of the cap have been included necessitating cutting or sawing the driven end of the connecting rod, after the parts are assembled, to provide a detachable cap. In contradistinction to such practice, my method involves the making of two shanks at one time and assembling the sections into an embryo connecting rod structure.

The various operations or successive steps of the process employed by me for forming a connecting rod will be hereinafter considered and to assist in an understanding of the invention, reference will be had to the drawing, wherein—

Fig. 8 is a plan of the partially stamped form shown in Fig. 4, illustrating the form as having been cut in half, apertured and slotted, such operation providing two parts of a single connecting rod shank;

Fig. 9 is a plan and end view of one of the parts as flanged;

Fig. 10 is a perspective view of the complete connecting rod with parts of the driven end thereof separated, and slightly modified.

Figure 1:
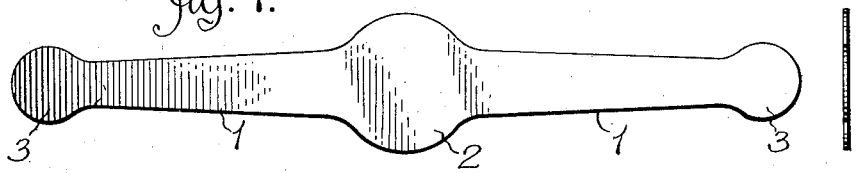
Figure 1 is a plan of a double blank from which shank parts may be formed.

As stated in the beginning, I make the main part of two connecting rod sections at one time and in carrying my process into practice, I first cut or stamp from metal, as from various kinds of steel or alloys, a double blank as shown in Fig. 1, this blank having tapering shank portions 1 a substantially circular intermediate portion 2, and substantially circular end portions 3. The central portion 2 eventually emerges into parts of the driven end of two connecting rod sections, and the end portions 3 eventually form the driving ends of the connecting rod assembly. To produce this blank, a suitable die may be employed and other dies or formers may be employed for performing additional operations in connection with the blank.

Figure 2:
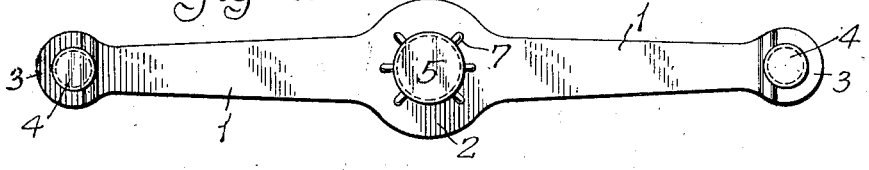
Fig. 2 is a similar view showing the formation of piston pin bosses and reinforcing ribs.
Figure 3:
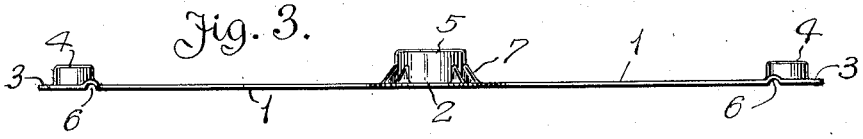
Fig. 3 is an edge view of the same.

The second operation or step of the process is shown in Figs. 2 and 3, where the blank is stamped or pressed to provide piston pin bosses 4 at the end portions 3 and a crank boss 5 at the central portion 2. The bosses 4 and 5 are drawn from the end portions 3 and the central portion 2 of the blank, and adjacent the piston pin bosses 4 are raised portions 6 which contribute to the formation of sleeves in the completed connecting rods. Contiguous to the crank boss 5 are a plurality of stiffening ribs 7 and as pointed out in my previous applications, these ribs are essential to reinforce the crank boss at its juncture with the shank portions 1 so as to prevent cracking or other injury to these portions of the connecting rod when subjected to excessive stresses and strains. Furthermore, it will be noted that the bosses, sleeve portions and ribs are all on one side of the double blank. Consequently dies or their mechanical equivalent can be advantageously used for so forming the blank.

Figure 4:
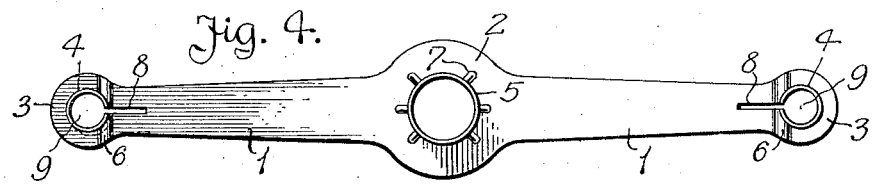
Fig. 4 is a plan of the pressed blank, it having its bosses apertured and the ends slotted.

The blank is now in condition for the third operation which has been shown in Fig. 4 said operation consisting of aperturing the bosses 4 and 5 and slotting the outer ends of the shank portions 1, as at 8, said slots communicating with the apertures 9 in the bosses 4. These slots will permit of the driving ends of the connecting rods being contracted about the piston pins.

Figure 5:
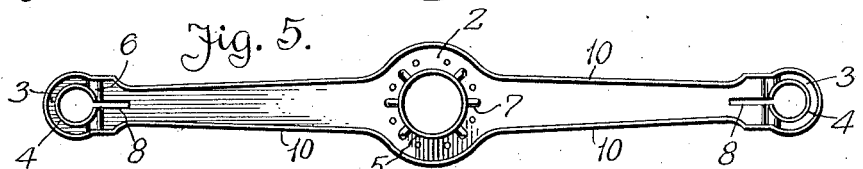
Fig. 5 is a similar view showing the formation of flanges.
Figure 6:
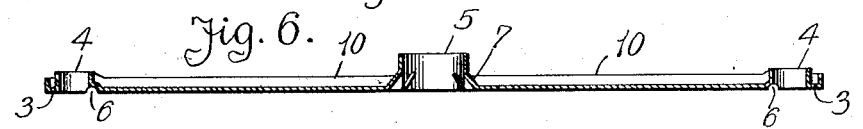
Fig. 6 is a longitudinal sectional view of the same.
Figure 7:
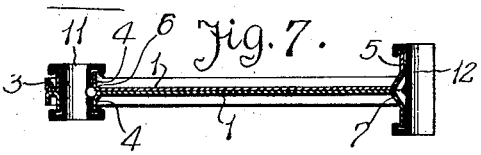
Fig. 7 is a longitudinal sectional view of a complete embryo assembly of rod.

Next in order is the fourth operation whereby the double pressed and apertured blank is provided with marginal outstanding flanges 10, said flanges imparting a channel shape to shank portion 1 of the double blank. By reference to Fig. 6, showing a longitudinal sectional view of the double blank as illustrated in Fig. 5, it will be noted that the apertured bosses 4 and 5 provide outstanding flanges at the intermediate and end portions of the blank and that the flanges or walls of the openings in the end portions of the blank are of a greater depth than the marginal flanges 10, while the walls of the opening in the crank boss 5 are necessarily of greater depth than the flanges 10 in order to afford a wide driven end for a connecting rod.

As will be seen, the resultant structure has produced a blank symmetrically disposed relative to a central transverse line of the blank with the parts on each side of the line of similar configuration and with the configurations symmetrical relative to each other. By dividing the blank thus formed into two parts by sawing or otherwise bisecting the blank on such transverse line— the step shown in Fig. 8—I form two connecting rod sections each of which has a complete circular boss 4 and a semi-circular boss configuration 5, as shown in Fig. 9.

The two sections thus produced are complemental to each other and hence may be used to produce the embryo assembly of a single rod by being positioned with the similar boss configurations of the sections in axial alinement and with the configurations extending in opposite directions. Whether the assembled sections are from the same blank or from different blanks is more or less immaterial, it being understood that each blank produces section structures such as will permit of the production of a complete assembly.

After such positioning of the pair of sections or parts, the succeeding step is practised, this consisting in positioning a ferrule or bushing formation 11 in the alined piston pin bosses 4, and a bushing or ferrule formation 12 in the boss configurations 5. The ferrule formations 11 and 12 may be made of brass provided with babbitt linings or bushings, and the ends of said ferrule formations are adapted to be turned over the outer ends of the boss configurations, preferably so as to inclose the end faces of said configurations, said bushing or ferrule formations constituting mechanical means for maintaining the positioned sections in their assembly relation. It is during or at this stage of the process that riveting, spot welding or any other fastening may be resorted to for connecting shanks and other portions of the assembly.

Reference will now be had to Fig. 10, showing a preferred form of complete connecting rod, and in this view, it will be noted that the driven end of the rod accommodates the flat head of a U bolt 19, which constitutes means in connection with nuts (not shown) for connecting a detachable cap to the body of the connecting rod. It is also preferable to place shims or washers 21 between the detachable cap and the body of the connecting rod. To place the U bolt 19 between the pieces of the connecting rod shank, it may be necessary to offset the pieces slightly, as shown in Fig. 10, so as to accommodate the flat head of the U-bolt, such bolt being disclosed in my pending application, Serial No. 180,053.

What I claim is:—

1. In the art of producing connecting rods, wherein the rod is formed of a rod portion and a cap separable therefrom, and wherein the rod portion includes an embryo assembly of two members of similar configuration together with bushing formations for the piston pin and crank pin openings, the method of producing such assembly which consists in shaping a sheet metal blank symmetrically relative to a central transverse line to produce two configurations each having a piston pin boss at its outer end and a single crank-pin boss symmetrically disposed relative to such line, bisecting the blank on such line to produce two independent sections, positioning complemental sections in assembly relation with similar boss configurations axially alined and projecting in opposite directions, positioning bushing formations relative to the alined boss configurations to produce an assembly in which each bushing projects beyond the ends of alined bosses and with each bushing integral from end to end, and completing the assembly by shaping the bushing to locate its opposite ends in overlying relation to the boss outer ends.

2. In the art of producing connecting rods, wherein the rod is formed of a rod portion and a cap separable therefrom, and wherein the rod portion includes an embryo assembly of two members of similar configuration together with bushing formations for the piston pin and crank pin openings, the method of producing such assembly which consists in shaping a sheet metal blank symmetrically relative to a central transverse line to produce two configurations each having a piston pin boss at its outer end and a single crank-pin boss symmetrically disposed relative to such line, bisecting the blank on such line to produce two independent sections, positioning complemental sections in assembly relation with similar boss configurations axially alined and projecting in opposite directions, positioning bushing formations relative to the alined boss configurations to produce an assembly in which each bushing projects beyond the ends of alined bosses and with each bushing integral from end to end, and completing the assembly by shaping the bushing to locate its opposite ends in overlying relation to the boss outer ends with the overlying portion inclosing the faces of the boss ends.

In testimony whereof I affix my signature in the presence of two witnesses.

ALEXIS R. PRIBIL.

Witnesses:
ANNA M. DORR,
KARL H. BUTLER.